United States Patent [19]

Suzuki et al.

[11] Patent Number: 5,268,125
[45] Date of Patent: Dec. 7, 1993

[54] PROCESS FOR PRODUCING CALCIUM TUNGSTATE PHOSPHOR

[75] Inventors: Hideo Suzuki, Odawara; Etsuo Shimizu, Tokyo; Yujiro Suzuki, Odawara; Kitaro Shigeta, Fujisawa; Takashi Johnokuchi, Yokohama, all of Japan

[73] Assignees: Kasei Optonix, Ltd.; Mitsubishi Kasei Corporation, both of Tokyo, Japan

[21] Appl. No.: 949,353

[22] Filed: Sep. 23, 1992

Related U.S. Application Data

[62] Division of Ser. No. 710,458, Jun. 5, 1991, abandoned.

[30] Foreign Application Priority Data

Jun. 5, 1990 [JP] Japan .................................. 2-146906

[51] Int. Cl.$^5$ ............................................ C09K 11/68
[52] U.S. Cl. ................................................. 252/301.5
[58] Field of Search ..................................... 252/301.5

[56] References Cited

U.S. PATENT DOCUMENTS 3,940,347 2/1976 Faria et al. ..................... 252/301.5

FOREIGN PATENT DOCUMENTS 520125 4/1940 United Kingdom ............ 252/301.5

OTHER PUBLICATIONS

Chemical Abstracts, vol. 81, No. 10, Columbus, Ohio, US; abstract No. 56092W, A. A. Mikhalev & Al; "Effects of Impurities and Preparative Factors . . ." 1974 (no date).

Primary Examiner—Jack Cooper
Attorney, Agent, or Firm—Oblon, Spivak, McClelland, Maier & Neustadt

[57] ABSTRACT

A calcium tungstate phosphor which comprises calcium tungstate as a host and vanadium, wherein the proportion of the vanadium to the calcium tungstate is within a range of from 0.01 to 30 ppm. The phosphor is produced by forming a solid calcium tungstate precipitate from an aqueous medium containing ammonia, calcium ion, tungstate ion and vanadate ion and firing the precipitate in the presence of fluxing material.

2 Claims, 2 Drawing Sheets

PROCESS FOR PRODUCING CALCIUM TUNGSTATE PHOSPHOR

This application is a division of application Ser. No. 07/710,458, filed on Jun. 5, 1991, now abandoned.

The present invention relates to a calcium tungstate phosphor which exhibits an emission of high luminance under X-ray excitation and a reduced afterglow, and a radiographic intensifying screen (hereinafter referred to simply as "intensifying screen") using the phosphor.

The intensifying screen is used to improve the speed of a photographic system in X-ray radiography. In general, an X-ray image of an object is obtained by sandwiching an X-ray film between two intensifying screens, irradiating thereon X-ray passed through the object, converting the X-ray to light, and exposing the film by the light.

The phosphors used for the intensifying screen are desired to have a high X-ray absorption, and a high luminous efficiency and high luminance under X-ray excitation, and properties that the response to the X-ray excitation is fast and the afterglow is as short as possible for forming accurately an image.

There have been used for many years calcium tungstate phosphors (hereinafter referred to as "$CaWO_4$") as one of phosphors for the intensifying screen. In order to obtain a $CaWO_4$ having a high luminance and a reduced afterglow which can be applied to practical use as the intensifying screen, as described in, for example, Japanese Unexamined Patent Publication No. 245098/1986 wherein the content of molybdenum (Mo) or phosphorus (P) in the $CaWO_4$ is reduced to not more than a specific amount, it is necessary to produced the $CaWO_4$ whose purity is as high as possible by using a material containing a small amount of impurities. However, it leads to high costs because of the purification of the raw material. There is another proposal wherein not less than 50 ppm of vanadium is incorporated to reduce the afterglow of the $CaWO_4$ in U.S. Pat. No. 3,940,347. However, the incorporation of vanadium in an amount of as large as not less than 50 ppm reduces the brightness considerably, to cause problems in practical use. In general, the reduction of the afterglow tends to be accompanied with the reduction of the brightness. Thus it is not easy to obtain a $CaWO_4$ exhibiting a small reduction of the brightness while reducing the afterglow.

The objects of the present invention are to provide a $CaWO_4$ which exhibits an extremely reduced afterglow and a high brightness under X-ray excitation, and to provide an intensifying screen which exhibits the extremely reduced afterglow and the high photographic speed.

The present inventors have made extensive researches on the relationship between impurity elements contained in the $CaWO_4$ and the afterglow after the X-ray excitation for accomplishing the above objects. As a result, it has been found that the afterglow can be reduced not only when the impurity elements in the $CaWO_4$ is removed, but also when the impurity is added contrarily to the $CaWO_4$, specifically only when a specific impurity is added. Particularly, in the case where vanadium is added to the $CaWO_4$, the afterglow can be unexpectedly reduced to a great extent by using a $CaWO_4$ containing vanadium in a concentration far less than the conventionally known content substantially without lowering the brightness under the X-ray excitation. It was also found that an intensifying screen exhibiting the reduced afterglow and the high photographic speed can be obtained by using the $CaWO_4$.

Namely, the $CaWO_4$ of the present invention comprises calcium tungstate as a host and vanadium, wherein the proportion of the vanadium to the calcium tungstate is within a range of from 0.01 to 30 ppm.

Also, the intensifying screen of the present invention essentially comprises a support and a fluorescent layer formed thereon, wherein the fluorescent layer comprises calcium tungstate as a host and vanadium, and the proportion of the vanadium to the calcium tungstate is within a range of from 0.01 to 30 ppm.

Figure 1:
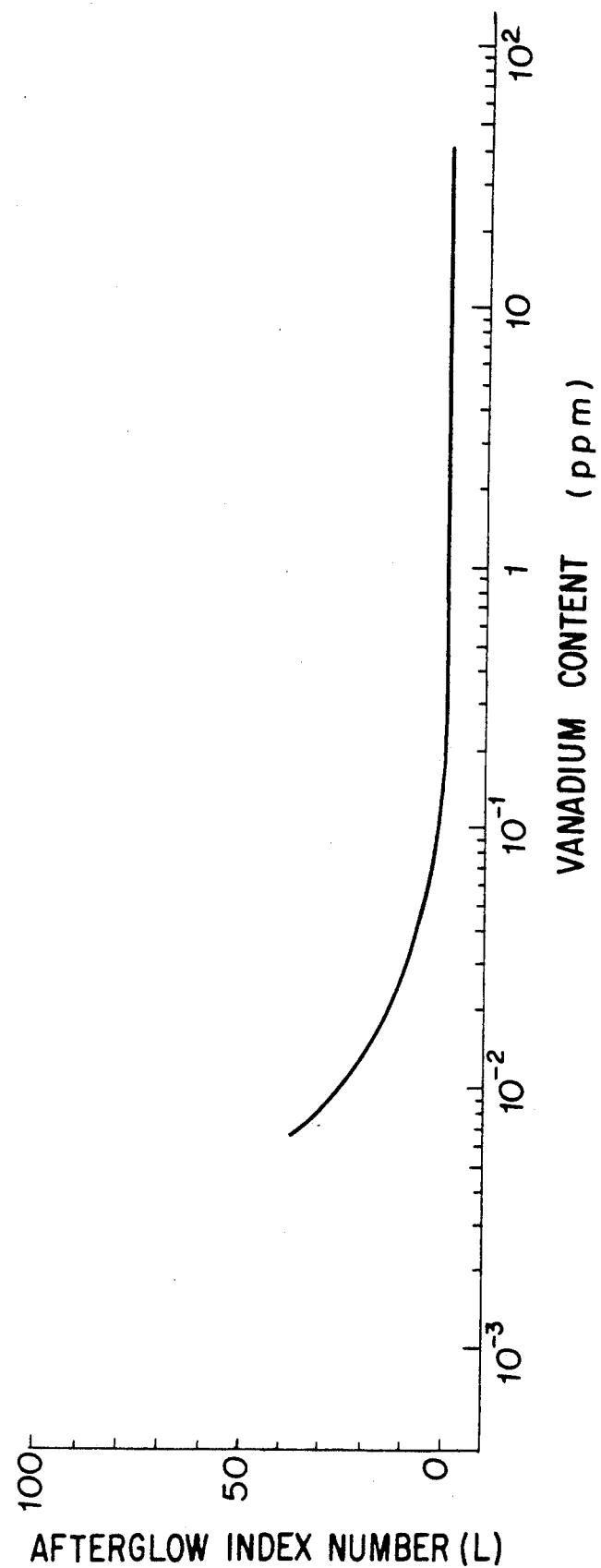
FIG. 1 is a graph showing the relationship between the content of vanadium in the $CaWO_4$ of the present invention and an afterglow index number of the $CaWO_4$.

The $CaWO_4$ of the present invention is produced in the same manner as of the manner for producing conventional $CaWO_4$ provided that a predetermined amount of vanadium is added in the course of production steps of the phosphor. The method of producing the $CaWO_4$ is roughly classified into the following two methods. In solid state method, powder of a tungsten compound and powder of a calcium compound are mixed, and a flux or the like is optionally added thereto, followed by firing to produce directly the $CaWO_4$ through a solid phase reaction. In a so-called chemical precipitation method, a solution containing tungstate ion and a solution containing calcium ion are mixed, and a precipitation of calcium tungstate formed by the reaction of these solutions is filtered, dried, mixed with a flux or the like, and then fired to produce $CaWO_4$. The $CaWO_4$ of the present invention can be produced by any one of these methods.

More particularly, when the $CaWO_4$ of the present invention is produced by the solid state method, predetermined amounts of a tungsten compound such as ammonium paratungstate $\{5(NH_4)_2O \cdot 12WO_3 \cdot 5H_2O\}$, sodium tungstate ($Na_2SO_4$) or tungstic acid ($WO_3 \cdot nH_2O$), a calcium compound such as calcium nitrate $\{(Ca(NO_3)_2\}$, calcium chloride ($CaCl_2$), calcium carbonate ($CaCO_3$) or calcium oxide ($CaO$), a vanadium compound such as a vanadate, for example, ammonium metavanadate ($NH_4VO_3$), potassium metavanadate ($KVO_3$) and vanadium pentoxide ($V_2O_5$), or oxides, halides, oxyhalides or the like of vanadium are mixed each in the state of powder, and filled in a heat-resistant container, followed by firing to conduct a solid phase reaction. When the $CaWO_4$ of the present invention is produced by the chemical precipitation method, predetermined amounts of a tungsten compound such as $5(NH_4)_2O \cdot 12WO_3 \cdot 5H_2O$, $Na_2WO_4$ or the like which is soluble in any solvent including water, acid, alkali or the like, a calcium compound such as $Ca(NO_3)_2$, $CaCl_2$, $CaCO_3$ or the like which is soluble in any solvent and a vanadium compound such as $NH_4VO_3$, $KVO_3$ or the like which is soluble in any solvent are mixed each in the state of solution, and the mixture is reacted to produce a crystal of calcium tungstate (hereinafter, a crystal of calcium tungstate which is not yet fired is referred to as "$CaWO_4$ raw material" for differenciating from the $CaWO_4$), and the crystal is filtered and dried to obtain the $CaWO_4$ raw material containing vanadium to complete the chemical precipitation method, and then the resultant $CaWO_4$ raw material is filled in a heat-resistant container and subjected to firing to obtain the $CaWO_4$ of the present invention.

In both of the cases where the raw mixture is fired by the solid state method and where the $CaWO_4$ raw material obtained by the chemical precipitation method is fired, since the brightness and particle size of the resultant $CaWO_4$ varies depending on the firing temperature, it is preferable to conduct the firing at a temperature of from 600° to 1,300° C. for 1 to 10 hours for obtaining the $CaWO_4$ having a desired particle size and high brightness. When the raw mixture for the phosphors or the $CaWO_4$ raw material obtained by the chemical precipitation method is fired, if a flux such as $CaCl_2$, $Na_2CO_3$, $KNO_3$, $MgCl_2$, $NH_4Cl$ or the like is added, the brightness of the resultant $CaWO_4$ can be further improved.

When the $CaWO_4$ of the present invention is produced, it is not necessarily needed to mix simultaneously the vanadium compound with the tungsten compound and calcium compound which are the raw materials for phosphors at the start of the production as described above. The vanadium compound may be added at any step of the production of the $CaWO_4$, for example, a predetermined amount of vanadium is previously added in the calcium compound or the tungsten compound which is the raw material for the phosphors; a predetermined amount of vanadium is added to the $CaWO_4$ obtained by the solid state method which contains no vanadium, and subjected to refiring; or a predetermined amount of vanadium is added to the $CaWO_4$ raw material obtained by the chemical precipitation method which contains no vanadium, and fired. Further, when the $CaWO_4$ is directly produced by the solid state method or when the $CaWO_4$ is produced by firing the $CaWO_4$ raw material obtained by the chemical precipitation method, the vanadium compound may be added in the state of powder or may be added in the state of solution wherein the vanadium compound is dissolved in an appropriate solvent such as water, acid or alkali. However, as far as the same kind of vanadium compound is added, when the vanadium compound is added in the state of solution, the resultant $CaWO_4$ exhibits smaller reduction of the brightness and larger reduction degree of the afterglow as compared with the other manner.

In the production of the intensifying screen of the present invention, the $CaWO_4$ phosphor of the present invention produced as described above is mixed with a binder resin such as nitrocellulose, an appropriate amount of solvent is added thereto to prepare a coating dispersion of a phosphor having an optimum viscosity, and then the coating dispersion is coated on a support composed of a paper, a plastic or the like, followed by drying to form a fluorescent layer. Further, a transparent protective film for preventing abrasion or the like of the fluorescent layer may be optionally formed on the fluorescent layer. The protective film can be formed by appropriately mixing a resin such as polymethacrylate or cellulose acetate and a solvent to obtain an optimum viscosity, and the mixture is coated on the fluorescent layer, followed by the drying or the laminating of a thin layer of polyethylene terephthalate or the like thereon.

FIG. 1 is a graph showing a relationship between the content of vanadium in the $CaWO_4$ and the quantity of light of afterglow $[L(x)]$ indicated by the afterglow index number $[L]$.

In the production of the $CaWO_4$, $5(NH_4)_2O.12WO_3.5H_2O$ was dissolved in water, and ammonia was added thereto to prepare a solution of ammonium tungstate, and after the addition of a predetermined amount of $NH_4VO_3$ to the solution, $CaCL_2$ was added thereto, and then a precipitation of a $CaWO_4$ thus formed was dried to obtain a $CaWO_4$ raw material which was followed by firing at 900° C. The content of vanadium in the $CaWO_4$ was quantitatively analyzed by using an Inductively Coupled Plasma-Mass Spectrometer (ICP-MASS) and Glow Discharge Mass Spectrometer (GD-MASS).

In FIG. 1, the afterglow index number $[L]$ of the ordinate is a value defined as follows. Respective phosphors were irradiated with X-ray under the same condition, and, after one second, X-ray films were contacted thereon and maintained for 30 minutes in a dark place, and then the densities of the X-ray films thus exposed were measured to obtain quantities of light of afterglow of respective $CaWO_4$ which is assumed as $[L(x)]$. The quantity of light of afterglow of the $CaWO_4$ containing no vanadium which was obtained in the same manner was assumed as $[L(o)]$. Then, the afterglow index number $[L]$ is defined by the formula: $[L]=([L(x)]/[L(o)])\times 100$. It means that the smaller this value is, the shorter the afterglow is than the $CaWO_4$ containing no vanadium is. (In this specification, "the $CaWO_4$ containig no vanadium" means a $CaWO_4$ containing less than the detectable amount of vanadium.) As understood from FIG. 1, the incorporation of vanadium into the $CaWO_4$ reduces the afterglow considerably. Namely, as compared with the conventional $CaWO_4$ containing no vanadium, the afterglow of the $CaWO_4$ containing 0.01 ppm of vanadium is reduced to about 30%, resulting in substantially no obstacle in practical use. Also, with the increase of the content of vanadium, the afterglow is further reduced, and in the range of not less than 0.1 ppm of vanadium, the afterglow is of a level substantially ignorable. In the range of not less than 0.3 ppm of the vanadium content, no afterglow can be observed.

As a result of measurement of the afterglow of the intensifying screen prepared by using the phosphor of the present invention and the relationship between the content of vanadium in the $CaWO_4$ used and the afterglow thereof, the results were the same as of those of the $CaWO_4$ indicated in FIG. 1.

Figure 2:
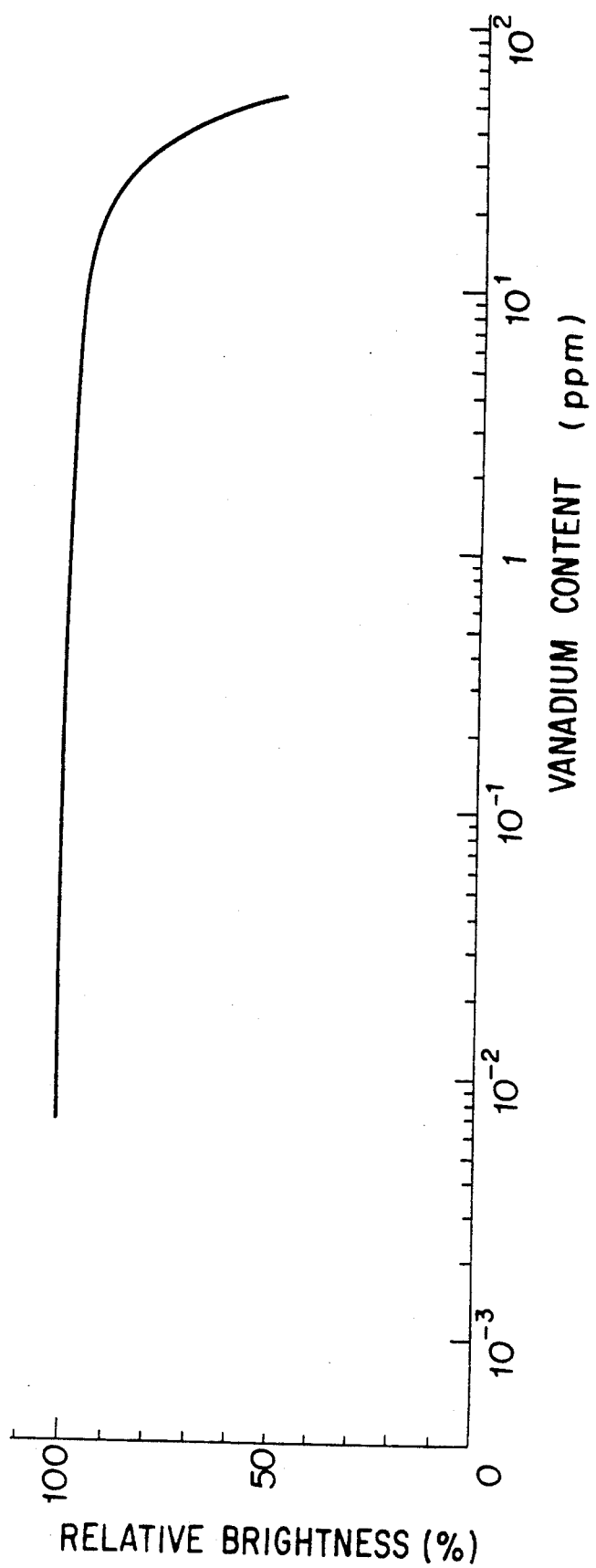
FIG. 2 is a graph showing the relationship between the content of vanadium in the $CaWO_4$ of the present invention and brightness of the $CaWO_4$.

FIG. 2 shows a relationship between the content of vanadium in the $CaWO_4$ and the brightness of it with respect to the $CaWO_4$ for the respective $CaWO_4$ indicated in FIG. 1. The ordinate in this Figure is a relative value when the brightness upon the X-ray irradiation under the same condition on the respective phosphors were measured by use of a photomultiplier, and the brightness of the $CaWO_4$ containing no vanadium was assumed as 100. As understood from FIG. 2, when the content of vanadium in the $CaWO_4$ becomes not less than a constant amount, although the brightness is a little lowered, the reduction of the brightness is small and cause no obstacle in practical use when the content of vanadium is not more than 30 ppm. As described above, with the increase of the content of vanadium in the $CaWO_4$, the afterglow of the phosphor is greatly reduced, but on the other hand, when the content of vanadium becomes larger than a constant amount, the brightness of the phosphor is gradually reduced.

Accordingly, from the relationship between the afterglow and brightness of the $CaWO_4$, and the relationship between the afterglow and photographic speed of the intensifying screen using the $CaWO_4$, the content of vanadium in the $CaWO_4$ is preferably in the range of from 0.01 to 30 ppm, more preferably from 0.1 to 10 ppm, and most preferably from 0.3 to 5 ppm, for reducing the afterglow and retaining the brightness at a level that does not cause any obstacle in practical use.

EXAMPLES 1 TO 5

To a hot aqueous solution of 80° C. having 1,000 g of ammonium paratungstate {5(NH$_4$)$_2$O.12WO$_3$.5H$_2$O} dissolved, was added ammonia. To this solution, was added an aqueous solution having 2.54 mg of ammonium metavanadate (NH$_4$VO$_3$) dissolved, and the mixture was thoroughly stirred. Then, while stirring the solution, an aqueous solution having 450 g of calcium chloride (CaCL$_2$) dissolved was added thereto and mixed to form a precipitation of calcium tungstate. The precipitation was dehydrated and dried to obtain a CaWO$_4$ raw material containing 1 ppm of vanadium. Then, 4% by weight of CaCl$_2$ as a flux was added to the CaWO$_4$ raw material and homogeneously mixed, and the mixture was charged in a heat-resistant container, followed by firing at 900° C. for 4 hours. The fired product thus obtained was washed and dried to obtain a CaWO$_4$ containing 1 ppm of vanadium (hereinafter this phosphor is referred to as a phosphor CW-1).

Further, four kinds of CaWO$_4$ (a phosphor CW-2, a phosphor CW-3, a phosphor CW-4 and a phosphor CW-5) each containing vanadium in an amount as indicated in Table 1 were produced in the same manner as in the production of the phosphor CW-1 described above except that the aqueous solution having 2.54 mg of NH$_4$VO$_3$ dissolved, which was added to the hot aqueous solution having 5(NH$_4$)$_2$O.12WO$_3$.5H$_2$O dissolved, was replaced with aqueous solutions whose dissolved amounts of NH$_4$VO$_3$ were each 0.254 mg, 10.2 mg, 25.4 mg and 76.2 mg.

EXAMPLE 6

To a hot aqueous solution of 80° C. having 1,000 g of ammonium paratungstate {5(NH$_2$)$_2$.12WO$_3$.5H$_2$O} dissolved, was added ammonia. While stirring the solution, an aqueous solution having 450 g of calcium chloride (CaCl$_2$) dissolved was added thereto and mixed to form a precipitation of calcium tungstate. The precipitation was dehydrated and dried to obtain a CaWO$_4$ raw material. Then, 1,000 g of the CaWO$_4$ raw material was weighed, and added with 2.30 mg of a powdery ammonium metavanadate (NH$_4$VO$_3$) and 4% by weight of CaCl$_2$ as a flux, and thoroughly mixed. The mixture was filled in a heat-resistant container and fired at 900° C. for 4 hours. Then, the fired product was washed and dried to obtain a CaWO$_4$ containing 1 ppm of vanadium (hereinafter a phosphor CW-6).

COMPARATIVE EXAMPLE 1

A CaWO$_4$ containing no vanadium was obtained in the same manner as in the production of the phosphor CW-1 in Example 1 except that the aqueous solution having NH$_4$VO$_3$ dissolved was not used (hereinafter this phosphor is referred to as a phosphor CW-R1).

COMPARATIVE EXAMPLE 2

A CaWO$_4$ containing 46 ppm of vanadium was produced in the same manner as of the production of the phosphor CW-1 in Example 1 except that the aqueous solution having 2.54 mg of NH$_4$VO$_3$ dissolved, which was added to the hot aqueous solution having ammonium paratungstate {5(NH$_4$)$_2$O.12WO$_3$.5H$_2$O} dissolved, was replaced with an aqueous solution having 177.8 mg of ammonium metavanadate (NH$_4$VO$_3$) dissolved (hereinafter this is referred to as a phosphor CW-R2).

Table 1 shows a relative brightness and an afterglow index number of the phosphors CW-1 to CW-6 described in Examples 1 to 6 and the phosphors CW-R1 and CW-R2 described in Comparative Examples 1 and 2 thus obtained.

TABLE 1

| | Phosphors | Content of vanadium (ppm) | Relative brightness (%) | Afterglow index number (%) |
|---|---|---|---|---|
| Example 1 | CW-1 | 1 | 101 | 0 |
| Example 2 | CW-2 | 0.1 | 101 | 3 |
| Example 3 | CW-3 | 4 | 98 | 0 |
| Example 4 | CW-4 | 10 | 96 | 0 |
| Example 5 | CW-5 | 25 | 88 | 0 |
| Example 6 | CW-6 | 1 | 99 | 1 |
| Comparative Example 1 | CW-R1 | less than the detectable amount | 100 | 100 |
| Comparative Example 2 | CW-R2 | 46 | 65 | 0 |

As understood from Table 1, the afterglow of the CaWO$_4$ containing vanadium is greatly reduced as compared with the CaWO$_4$ containing no vanadium. Also, the reduction of the brightness of the respective CaWO$_4$ under X-ray excitation is small when the content of vanadium is 25 ppm or less.

EXAMPLE 7

A coating dispersion for a phosphor comprising the phosphor CW-1 described in Example 1 and a vinyl chloride-vinyl acetate copolymer was coated by used of a knife coater on a support composed of a polyethylene terephtharate so that the coating weight of the phosphor after drying would be about 50 mg/cm$^2$, and dried to form a fluorescent layer. Then, on this fluoroescent layer, a transparent protective film composed of acetyl cellulose was formed so that the thickness after drying would be about 10 μm to obtain an intensifying screen (hereinafter this is referred to as an intensifying screen SC-1).

Further, intensifying screens SC-2, SC-3, SC-4, SC-5 and SC-6 were produced in the same manner as in the production of the above-mentioned intensifying screen SC-1 except that the phosphor CW-1 was replaced with each of the phosphors CW-2, CW-3, CW-4, CW-5 and CW-6 described in Examples 2 to 6.

Separately, intensifying screens SC-R1 and SC-R2 were produced for comparison in the same manner as in the production of the above-mentioned intensifying screen SC-1 except that the phosphor CW-1 was replaced with each of the phosphors CW-R1 and CW-R2.

The intensifying screens obtained as mentioned above were contacted on X-ray films and irradiated with X-ray of uniform dose and then the densities of the exposed X-ray films were compared to determine the photographic speeds of the intensifying screens. The photographic speeds thus obtained were relatively compared with the afterglow index numbers of the intensifying screens determined by the above-mentioned method using the X-ray films. The results were substantially the same as of the relationship in FIG. 1 for the afterglow index numbers of the phosphors used for the intensifying screens and the relationship in FIG. 2 for the brightness of the phosphors. It was also found that the intensifying screens using the $CaWO_4$ containing vanadium in an amount of 25 ppm or less showed an extremely reduced afterglow as compared with the intensifying screen using the $CaWO_4$ containig no vanadium, and that the reduction of the photographic speed was of a level that no obstacle is brought about in practical use.

The $CaWO_4$ of the present invention containing 0.01 to 30 ppm of vanadium has a high luminance and a greatly reduced afterglow, and the intensifying screen of the present invention using the $CaWO_4$ can greatly reduce the afterglow substantially without reduction of the photographic speed as compared with the conventional intensifying screen using the $CaWO_4$ containing no vanadium.

We claim:

1. A process for producing a calcium tungstate phosphor comprising calcium tungstate as a host and vanadium, said process comprises:
   (a) forming a solid calcium tungstate precipitated from aqueous medium by mixing an aqueous solution containing calcium ion with an aqueous solution containing tungstate ion, ammonia and vanadate ion, in relative amounts required to precipitate solid calcium tungstate wherein the proportion of vanadium to calcium tungstate in said precipitate is within the range of from 0.01-30 ppm,
   (b) separating the precipitated solid calcium tungstate containing vanadium,
   (c) adding a fluxing material selected from the group consisting of $CaCl_2$, $Na_2CO_3$, $KNO_3$, $MgCl_2$ and $NH_4Cl$ to the solid calcium tungstate,
   (d) firing the resultant composition at a temperature of about 600° C. to 1,300° C., and
   (e) washing the first composition with water to remove any residual water-soluble contaminants.

2. The process according to claim 1, wherein the proportion of the vanadium to the calcium tungstate in the precipitated calcium tungstate is within the range of from 0.3 to 5 ppm.

* * * * *